United States Patent [19]

Olsen

[11] Patent Number: 4,484,680

[45] Date of Patent: Nov. 27, 1984

[54] CONTAINER FOR SELF DEVELOPING FILM AND PRINTS

[76] Inventor: Bill R. Olsen, 2650 W. 220 North, Provo, Utah 84601

[21] Appl. No.: 599,479

[22] Filed: Apr. 12, 1984

[51] Int. Cl.³ .................. G03B 17/56; B65D 85/00
[52] U.S. Cl. .................. 206/455; 206/316; 354/75; 220/345; 220/339
[58] Field of Search .................. 206/455, 454, 316; 220/345, 18, 339; 354/75, 354, 86; 150/52 J

[56] References Cited

U.S. PATENT DOCUMENTS

| | | | |
|---|---|---|---|
| 1,415,776 | 5/1922 | Bourne | 150/52 J |
| 2,532,083 | 11/1950 | Brenner | 220/345 |
| 3,249,029 | 5/1966 | Wareham | 206/454 |
| 3,534,675 | 10/1970 | Halfen | 206/454 |
| 3,719,970 | 3/1973 | Carlson | 206/455 |
| 3,756,387 | 9/1973 | Chaney | 220/345 |
| 3,864,711 | 2/1975 | Matthews | 354/354 |
| 4,340,285 | 7/1982 | Clarke | 354/75 |

*Primary Examiner*—William T. Dixson, Jr.
*Attorney, Agent, or Firm*—Thorpe, North & Western

[57] ABSTRACT

A container assembly attachable to or integral with the body of an instant camera for carrying packs of unexposed film or developed prints which consists of a generally rectangular housing having a hinged or sliding door which opens at the bottom or end of the housing to provide access into the interior thereof. Attachment means on the container assembly allow the assembly to be secured to the camera body by friction fit or screw means.

20 Claims, 8 Drawing Figures

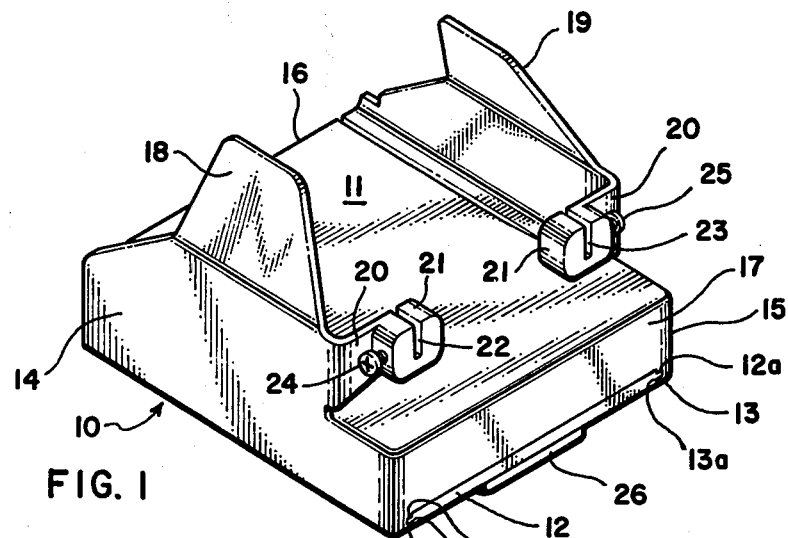
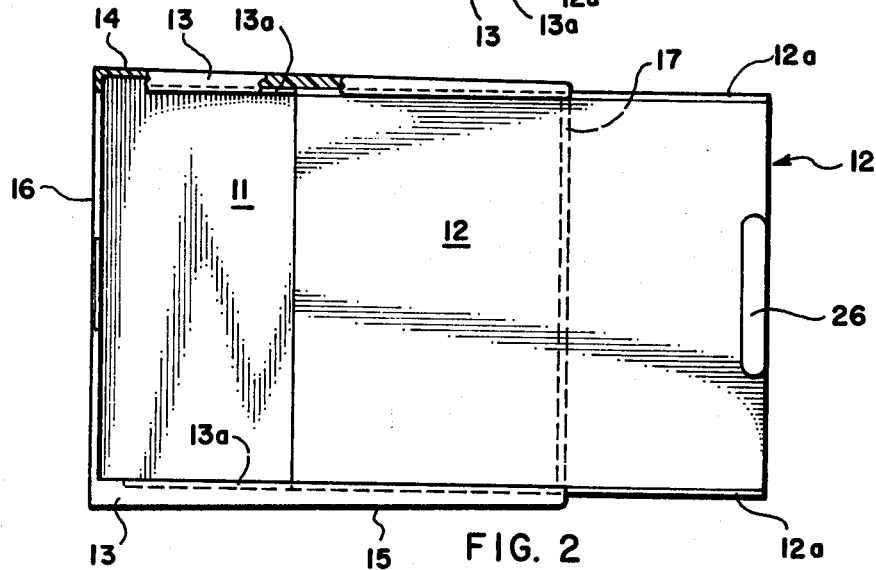
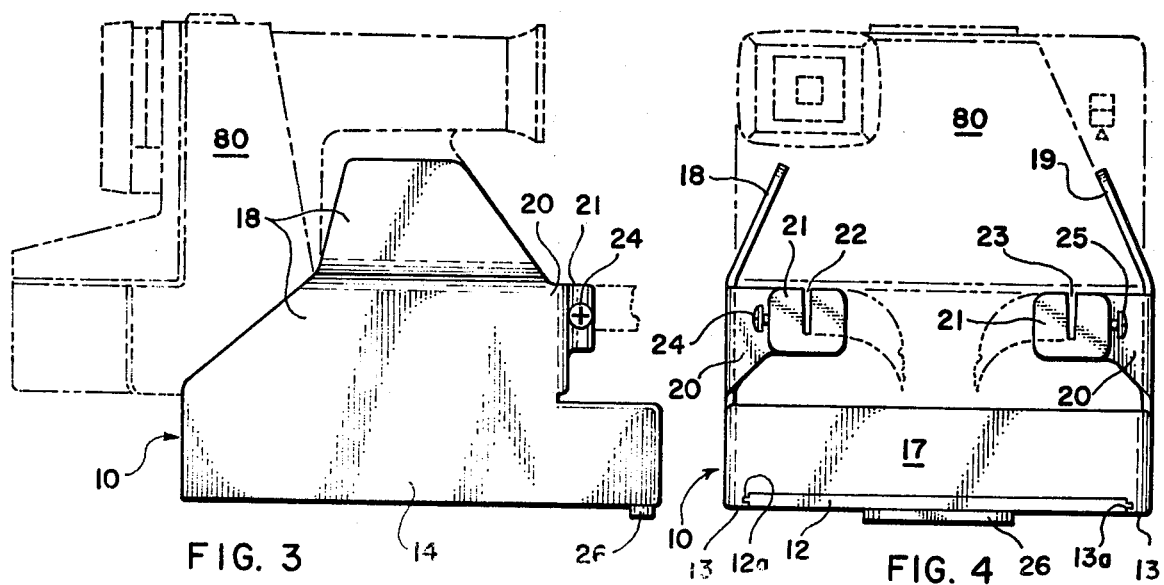

CONTAINER FOR SELF DEVELOPING FILM AND PRINTS

BACKGROUND OF THE INVENTION

This invention relates to a container for holding unexposed packs of self developing film or developed prints. More particularly, this invention relates to a container for holding such unexposed films or developed prints which is integral with or attachable to an instant camera.

Many instant cameras are now being marketed which contain film in a stacked pack. A pack is placed in the camera and the films are exposed serially. As each film is exposed it is ejected from the camera and the chemicals contained on the film cause the exposed film to slowly develop into a print without further processing. When a film pack is depleted the spent film container is removed from the camera and a new pack must be inserted.

A problem associated with instant cameras is where to carry unexposed film packs and what to do with exposed prints so that they will not be bent, curled or folded. Often the instant camera is carried by a cord or sling around the neck of the wearer and there is no ready place to carry unexposed film packs or developed prints of exposed film. Placing developed prints in a pocket or similar place results in the print being bent or culred thereby ruining its appearance. Also, it is often desirable to quickly replace a spent film pack with a fresh one with minimum interruption. This is inconvenient if one must hunt through a camera bag or separate container. U.S. Pat. No. 4,305,498 attempts to solve one aspect of this problem by utilizing a modified spent film pack to hold a developing print. This modified pack is attachable to an instant camera through the use of velcro attachment means. However, this does not solve the problem of storing unexposed film packs or of holding a multiplicity of developed prints.

OBJECTS AND BRIEF DESCRIPTION OF THE INVENTION

It is an object of the present invention to provide a container which forms a part of or is attachable to an instant camera and which can contain either unexposed film packs or prints of developed film or both.

It is also an object of the present invention to provide a container forming part of or attachable to an instant camera body which container is easily accessible to the user of the camera for removing packs of unexposed film or inserting prints of developed film.

These and other objects may be accomplished by means of a container assembly which either forms part of or is attachable to the body of an instant camera. The container consists of a generally rectangular housing having flat parallel upper and lower panels, parallel sidewalls and parallel front and rear endwalls, all of which are contiguous so as to define the container cavity. Access to the container interior is through a closable opening formed by a slidable door contained in the lower panel or by a hinged door contained in an endwall of the container. The container may form part of the case of the instant camera or the upper panel may contain means for attaching the container to the case of an instant camera. Suitable attachment means may be either upwardly extending wings adapted to fit about and grasp a camera case or screw means which may secure the container to a camera case through the tripod attachment hole contained therein.

BRIEF DESCRIPTION OF THE DRAWINGS

FIG. 1 is a perspective view of one embodiment of the invention showing a container assembly with attachment wings for securing the container to the body of an instant camera.

FIG. 2 is a bottom view of the assembly shown in FIG. 1 with the sliding door in the lower panel partially open showing the interior thereof.

FIG. 3 is a side elevation view of the assembly shown in FIG. 1 showing a camera contained therein in phantom lines.

FIG. 4 is a rear elevation view of the assembly shown in FIG. 1 showing a camera contained therein in phantom lines.

DETAILED DESCRIPTION OF THE INVENTION

Figure 5:
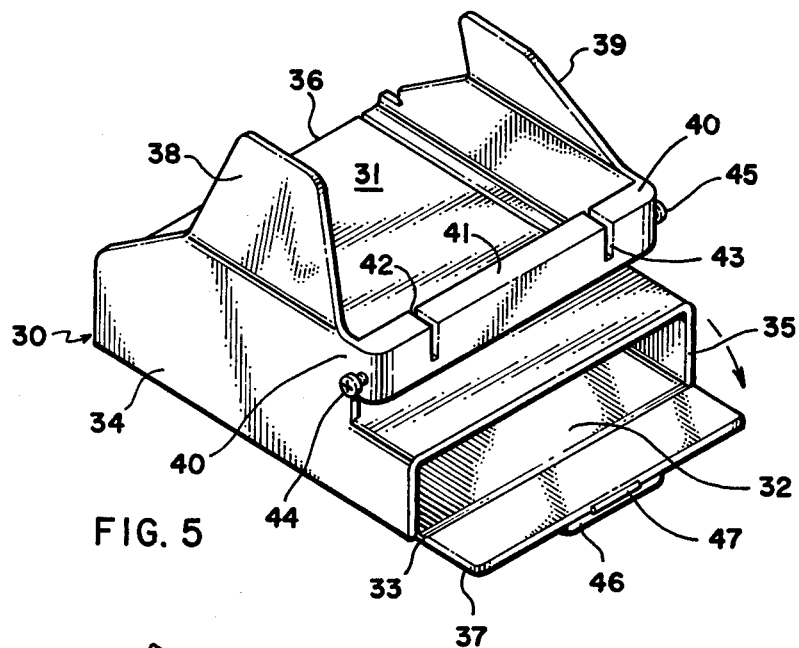
FIG. 5 is a perspective view of a second embodiment of the invention showing a container assembly having a hinged door in the rear endwall of the container and having attachment similar to that shown in FIG. 1.

There is shown in FIGS. 1-4 one complete embodiment of the invention. The container assembly 10 consists of a housing formed by an upper panel 11, a lower panel consisting of a sliding door 12 having a tongue 12a on either side thereof mounted in grooves 13a contained in partial panel walls 13. The container is completed by sidewalls 14 and 15, a front endwall 16 and a rear endwall 17.

Partial panel walls 13 may be omitted if desired. If so, the door 12 would comprise the entire lower panel and be mounted by tongues 12a contained in grooves 13a contained in the lower portion of sidewalls 14 and 15. Whenever lower panel walls are referred to in this disclosure the corresponding modification just referred to is also deemed to be included. Therefore, sliding door 12 may make up all or substantially all of the lower panel.

As shown in FIGS. 1-4 the means for attaching assembly 10 to a camera 80 consist of wings 18 and 19 which extend upwardly and then veer upwardly and inwardly from the sidewalls 14 and 15 of the container. At the back end of the upward portion of wings 18 and 19 and preferably interconnecting them is a stop bar 20. Bar 20 is normal to the wings 18 and 19 and contains a thickened central portion 21 having slots 22 and 23 adapted to receive the carrying strap of an instant camera. Screw means 24 and 25 are contained in the outer ends of the thickened portion 21 and extend to slots 22 and 23. The tightening of screw means 24 and 25 will secure the camera strap in slots 22 and 23.

If desired bar 20 may interconnect wings 18 and 19 as shown in FIG. 5. As shown in FIGS. 1 and 3, bar 20 depends inwardly from the wings 18 and 19 only a predetermined inwardly from the wings 18 and 19 only a predetermined distance. In that instance bar 20 has a first portion of one thickness and a second end portion 21 of a greater thickness. Slots 22 and 23 are contained in the thickened end portion 21 as shown in FIGS. 1 and 3.

The exact shape of the wings 18 and 19 and the positioning of bar 20 will depend upon the camera model. This invention is particularly adaptable for use with various instant cameras sold under the trademark "Polaroid Land Camera".

The type of camera to which the container assembly is to be attached will obviously have some bearing on the size of the container cavity. The depth, breadth and width can vary as desired. The sliding door 12 will preferably have a handle means 26 to facilitate opening of the door. Also the rear portion of the door 12 and front endwall 16 will contain means for friction or snap locking the door 12 in a closed position.

A second embodiment of the invention is shown in FIG. 5. This version parallels that shown in FIGS. 1-4 with the exception that a hinged door at the rear endwall has replaced the sliding door in the lower panel. The container assembly 30 as shown consists of an upper panel 31, a lower panel 32, sidewalls 34 and 35, a front endwall 36 and a hinged door 37 forming the rear endwall. The assembly is preferably made of a plastic material with the hinge 33 being a living hinge. However, conventional hinge means, such as a piano hinge, can also be used.

Wings 38 and 39 as described with reference to FIGS. 1-4 serve as the means for attaching the assembly 30 to a camera, not shown. A stop bar 40 having a thickened portion 41 is also used to position the camera in the assembly. The stop bar contains slots 42 and 43 to accommodate a camera strap and has screw means 44 and 45 to secure the strap in the slots. The hinged door 37 contains a handle 46 to facilitate opening the door and a snap lock 47 to secure the door in a locked position against the surface of upper panel 31 when the door is closed. The size of the container will be sufficient that a pack of instant film can be inserted into the cavity of the container when door 37 is opened. Additionally, exposed prints can be stored in the cavity in the place of or in addition to a film pack.

Figure 6:
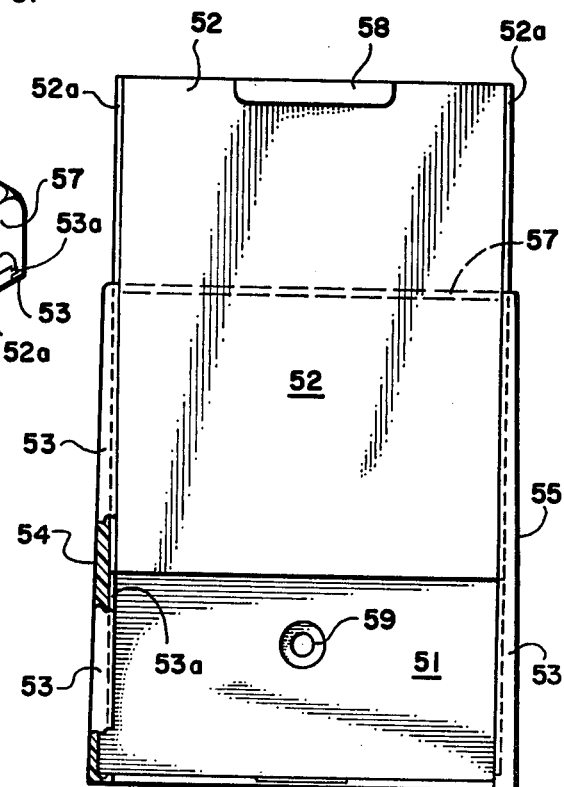
FIG. 6 is a perspective view of a third embodiment of the invention showing a container assembly adapted to be attached to the bottom of a camera case by screw means.
Figure 7:
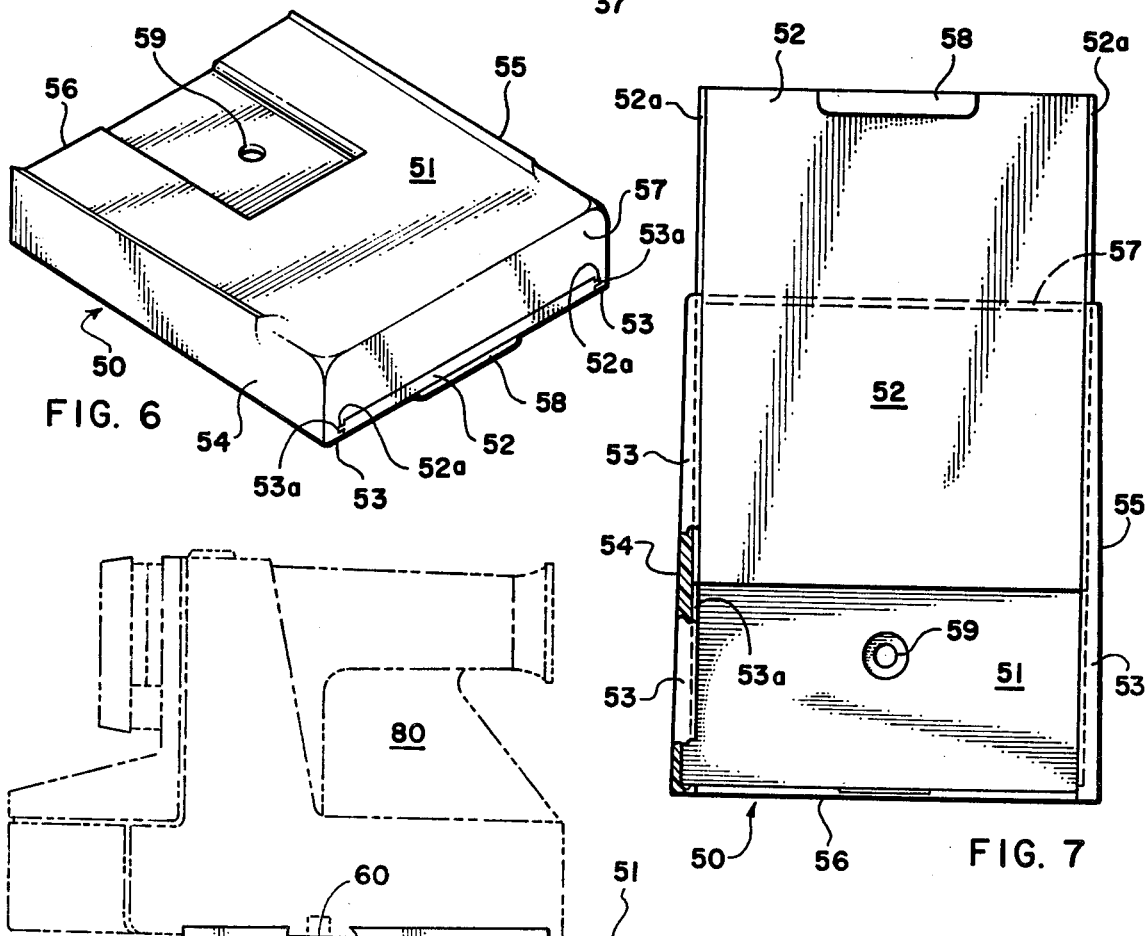
FIG. 7 is a bottom view of the assembly shown in FIG. 6 with the sliding door in the lower panel partially open showing the interior thereof.
Figure 8:
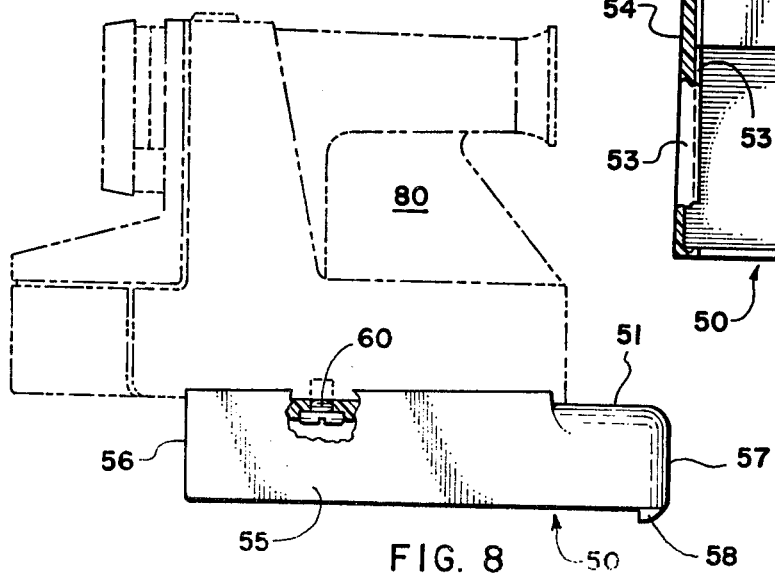
FIG. 8 is a side elevation view of the assembly shown in FIG. 6 showing the camera attached thereto in phantom lines.

A third embodiment is shown in FIGS. 6-8 and is useable with instant cameras containing a threaded aperture in the base of the camera housing for securing the camera to a tripod. In this embodiment the container assembly 50 consists of an upper panel 51, a lower panel consisting of a sliding door 52 having tongues 52a on either side thereof. The tongues are supported in grooves 53a contained in partial floors 53 of this lower panel. Sidewalls 54 and 55 and a front endwall 56 and rear endwall 57 complete the container.

A depression 58 or other handle means contained in door 52 serve to facilitate the opening and closing of the door.

Attachment to a camera is accomplished by placing a screw 60 through aperture 59 contained in upper panel 51 and threading the screw into the threaded tripod aperture in the base of camera 80 as shown in FIG. 8. In order to attach container 50 to camera 80, the door 52 is opened by sliding in a rearward direction to allow access to the interior of the container so screw 60 can be inserted through aperture 59. In this embodiment a sliding door is more practical than the hinged door as shown in FIG. 5. However, a hinged door could also be used provided an aperture in alignment with hole 59 was also contained in the lower panel of the container so that the screw 60 could be inserted through such an aperture and into hole 59.

Other modifications could also be made without departing from the scope of the invention. For example, the sliding doors 12 and 52 could be made to slide in the opposite direction, i.e. forwardly, and the hinged door 37 could be contained in the forward endwall instead of the rear endwall. As previously stated, the upper panel could also be part of the camera body and the container assembly would then become a continuous part of the camera body itself. In the above descriptions, the upper panel should be considered as being part of the camera so as to include each described embodiment as being part of the camera body itself.

Another modification to the embodiment shown in FIG. 6-8 can result by the use of velcro fastening means contained of the upper surface of panel 51 and on the lower surface of the camera body. The container, attached in this manner, could have either a sliding lower panel door or an endwall hinged door.

The container will preferably be made of a plastic material much the same as used for instant camera bodies. Although the preferred embodiments of this invention have been set out in detail above, other modifications may be made without departing from the scope of this invention which to be limited only by the appended claims which follow.

What is claimed is:

1. A container assembly attachable to the body of an instant camera such that the container is adjacent to and underlies the lower surface of said instant camera and is adapted to hold packs of unexposed film or developed prints which comprises:
    (a) a generally rectangular housing consisting of an upper panel, a lower panel, sidewalls, a front endwall and a rear endwall, all of which are contiguous with each other with said panels, sidewalls and endwalls, each being parallel,
    (b) door means contained in an endwall or lower panel or said housing to allow access into the interior thereof,
    (c) attachment means contained on said housing for attaching said container assembly to the body of an instant camera.

2. A container assembly as claimed in claim 1 wherein said attachment means consists of wings which extend upwardly from the sidewalls of said housing away from the upper panel for a predetermined distance and then veer upwardly and inwardly a predetermined distance, said wings and upper panel being configured to frictionally engage the bottom and side surfaces of an instant camera.

3. A container assembly as claimed in claim 2 wherein stop means extending inwardly and normal to the plane of the wings are contained on the backward edge of the upwardly extending portion of said wings to limit the distance an instant camera body can be inserted into said container assembly between said wings.

4. A container assembly as claimed in claim 3 wherein said door means is contained in said lower panel such that said lower panel consists of a sliding door extending from said front endwall to said rear endwall and slidably contained between opposing partial panel walls extending inwardly from the lower portion of adjacent sidewalls.

5. A container assembly as claimed in claim 3 wherein said door means is contained in said lower panel such that said lower panel consists of a sliding door extending from said front endwall to said rear endwall and slidably contained between the lower portion of opposing sidewalls.

6. A container assembly as claimed in claim 3 wherein said door means is a swinging door consisting of an endwall which is connected to the lower panel by hinge means.

7. A container assembly as claimed in claim 6 wherein said hinge means is a living hinge.

8. A container assembly as claimed in claim 6 wherein said swinging door is the rear endwall.

9. A container assembly as claimed in claim 3 wherein said stop means consists of inwardly extending bars having initial and terminal portions said bars extending inwardly from each wing a predetermined distance toward each other, the initial portion of each bar extending from said wings being of one thickness with the terminal portion of each bar being of a greater thickness, the terminal portion of each bar containing a transverse vertical slot extending downwardly from the upper bar surface a predetermined distance.

10. A container assembly as claimed in claim 9 wherein said terminal portion of each bar contains screw means in the same longitudinal plane as said bar, said screw means extending from the beginning of said terminal portion to said transverse slots and adapted to secure camera straps in said slots when inserted therein.

11. A container assembly as claimed in claim 10 wherein said terminal portions of said bars interconnect with each other such that said stop means extends continuously from one wing to the other.

12. A container assembly as claimed in claim 1 wherein said attachment means consists of an aperture in said upper panel and screw means insertable through said upper panel for securing said container assembly to said camera through threaded means contained in the base of the housing of said camera.

13. A container assembly as claimed in claim 12 wherein said door means is contained in said lower panel such that said lower panel consists of a sliding door extending from said front endwall to said rear endwall and slidably contained between opposing partial panel walls extending inwardly from the lower portion of adjacent sidewalls.

14. A container assembly as claimed in claim 12 wherein said door means is contained in said lower panel such that said lower panel consists of a sliding door extending from said front endwall to said rear endwall and slidably contained between the lower portion of opposing sidewalls.

15. A unitary instant camera body and container assembly wherein the container assembly portion underlies the instant camera body portion and is adapted to hold packs of unexposed film or developed prints and wherein the container assembly portion comprises:
 (a) a generally rectangular housing which is a continuation of said camera body portion and consists of an upper panel, a lower panel, sidewalls, a front endwall and a rear endwall, all of which are contiguous with each other, with said panels, sidewalls and endwalls, each being parallel, and
 (b) door means contained in an endwall or lower panel of said housing to allow access into the interior thereof.

16. An unitary instant camera body and container assembly as claimed in claim 15 wherein said door means is contained in said lower panel such that said lower panel consists of a sliding door extending from said front endwall to said rear endwall and slidably contained between opposing partial panel walls extending inwardly from the lower portion of adjacent sidewalls.

17. An unitary instant camera body and container assembly as claimed in claim 15 wherein said door means is contained in said lower panel such that said lower panel consists of a sliding door extending from said front endwall to said rear endwall and slidably contained between the lower portion of opposing sidewalls.

18. An unitary instant camera body and container assembly as claimed in claim 15 wherein said door means is a swinging door consisting of an endwall which is connected to the lower panel by hinge means.

19. A unitary instant camera body and container assembly as claimed in claim 18 wherein said hinge means is a living hinge.

20. An unitary instant camera body and container assembly as claimed in claim 18 wherein said swinging door is the rear endwall.

* * * * *